US010883585B2

(12) United States Patent
Mori

(10) Patent No.: US 10,883,585 B2
(45) Date of Patent: Jan. 5, 2021

(54) DIFFERENTIAL DEVICE

(71) Applicant: MUSASHI SEIMITSU INDUSTRY CO., LTD., Toyohashi (JP)

(72) Inventor: Hiroyuki Mori, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 16/498,135

(22) PCT Filed: Mar. 20, 2018

(86) PCT No.: PCT/JP2018/011141
§ 371 (c)(1),
(2) Date: Sep. 26, 2019

(87) PCT Pub. No.: WO2018/180806
PCT Pub. Date: Oct. 4, 2018

(65) Prior Publication Data
US 2020/0318719 A1 Oct. 8, 2020

(30) Foreign Application Priority Data
Mar. 30, 2017 (JP) .................................. 2017-067252

(51) Int. Cl.
*F16H 48/08* (2006.01)
*F16H 48/40* (2012.01)
*F16H 48/38* (2012.01)

(52) U.S. Cl.
CPC ............. *F16H 48/08* (2013.01); *F16H 48/40* (2013.01); *F16H 2048/082* (2013.01);
(Continued)

(58) Field of Classification Search
CPC .... F16H 48/08; F16H 48/40; F16H 2048/087; F16H 2048/085; F16H 2048/382; F16H 2048/082
See application file for complete search history.

(56) References Cited

U.S. PATENT DOCUMENTS 2,096,834 A * 10/1937 Allison ................... F16H 48/08
475/221
2,313,183 A * 3/1943 Trbojevich .................... 475/336
(Continued)

FOREIGN PATENT DOCUMENTS

CN 202441834 U 9/2012
JP S59-63251 U 4/1984
(Continued)

*Primary Examiner* — David J Hlavka
(74) *Attorney, Agent, or Firm* — Carrier Blackman & Associates, P.C.; Joseph P. Carrier; William D. Blackman

(57) ABSTRACT

A differential device includes a differential gear mechanism having a plurality of differential gears, a plurality of differential gear support bodies supporting the plurality of differential gears, and a pair of output gears meshing with each of the differential gears; and a differential case having a support member having a plurality of opposite ends-supporting parts supporting opposite end parts of each of the differential gear support bodies, a first cover member covering a back face of one of the output gears and capable of being joined to the support member, and a second cover member covering a back face of the other output gear and capable of being joined to the support member, wherein a recess portion facing a back face of each of the differential gears is formed in an outer support part, supporting of the differential gear support body on an outer side of the output gear.

20 Claims, 5 Drawing Sheets

(52) U.S. Cl.
CPC .. *F16H 2048/085* (2013.01); *F16H 2048/087* (2013.01); *F16H 2048/382* (2013.01)

(56) References Cited

U.S. PATENT DOCUMENTS

| | | | | |
|---|---|---|---|---|
| 3,253,483 | A * | 5/1966 | McCaw | F16H 48/29 475/226 |
| 6,692,398 | B1 * | 2/2004 | Sullivan | F16H 48/08 475/230 |
| 7,470,207 | B2 * | 12/2008 | Todd | F16H 48/08 475/230 |

FOREIGN PATENT DOCUMENTS

| | | |
|---|---|---|
| JP | 2008-128265 A | 6/2006 |
| JP | 2008-261491 A | 10/2008 |
| JP | 4784444 B2 | 10/2011 |
| JP | 2012-112516 A | 6/2012 |
| JP | 2016-109297 A | 6/2016 |

\* cited by examiner

DIFFERENTIAL DEVICE

TECHNICAL FIELD

The present invention relates to a differential device that is suitable for a vehicle such as for example an automobile.

BACKGROUND ART

Conventionally, as a differential device, a technique in which a plurality of pinion gears (differential gears) are each supported by a short pinion shaft (differential gear support body), and the pinion shaft is doubly supported by a support member is known (see e.g. Patent Document 1).

With regard to a differential device, a technique in which a lubricating oil storage part formed from an arc-shaped recess part around the rotational axis of a differential case (input member) is provided in an inner face of the differential case, and lubricating oil is supplied to a supported face of an outer peripheral part or a side part of a pinion gear (differential gear) is known (see e.g. Patent Document 2).

Furthermore, with regard to a differential device, a technique in which an inward-facing lip for retaining lubricating oil is provided at the edge of an opening of a differential case that is for a side gear (output gear) and a pinion gear to be fitted into, and the amount of lubricating oil retained within the differential case, and consequently the amount of lubricating oil supplied to parts where the side gear and the pinion gear mesh with each other, is increased is known (see e.g. Patent Document 3).

RELATED ART DOCUMENTS

Patent Documents

Patent Document 1: Chinese Utility Model No. CNY202441834
Patent Document 2: Japanese Patent No. 4784444
Patent Document 3: Japanese Patent Application Laid-open No. 2008-128265

SUMMARY OF THE INVENTION

Problems to be Solved by the Invention

With regard to the differential device of Patent Document 1, there is no disclosure regarding the lubrication of rotational sliding surfaces between a back face of the pinion gear and a differential case.

With regard to the differential device of Patent Document 2, although the amount of lubricating oil supplied to the supported faces of the outer peripheral part and the side part of the pinion gear can be increased, no measures are taken for lubrication of the rotational sliding surfaces between the back face of the pinion gear and the differential case, and sufficient lubricating oil cannot necessarily be supplied to the rotational sliding surfaces between the back face of the pinion gear and the differential case.

Furthermore, with regard to the differential device of Patent Document 3, although the amount of lubricating oil supplied to the parts where the side gear and the pinion gear mesh with each other can be increased, no measures are taken for lubrication of the rotational sliding surfaces between the back face of the pinion gear and the differential case, and sufficient lubricating oil cannot necessarily be supplied to the rotational sliding surfaces between the back face of the pinion gear and the differential case.

The present invention has been accomplished in light of the above circumstances, and it is an object thereof to provide a differential device that can improve the lubrication performance of rotational sliding surfaces between a back face of a pinion gear (differential gear) and a support member or a differential case (input member).

Means for Solving the Problems

In order to attain the above object, a differential device according to the present invention comprises a differential case and a differential gear mechanism housed within the differential case, the differential gear mechanism comprising a plurality of differential gears, a pair of output gears meshing with each of the plurality of differential gears, and a plurality of differential gear support bodies supporting the plurality of differential gears respectively, the differential case comprising a support member having a plurality of opposite ends-supporting parts supporting opposite end parts of each of the plurality of differential gear support bodies, a first cover member covering a back face of one of the output gears and capable of being joined to the support member, and a second cover member covering a back face of the other output gear and capable of being joined to the support member, a recess portion facing a back face of each of the differential gears being formed in an outer support part, supporting one end part of the differential gear support body on an outer side in a radial direction of the output gear, of each of opposite ends-supporting parts, and a side, in an axial direction of the output gear, of each of the outer support parts being covered by the first and second cover members.

Preferably, each of the outer support parts has first and second wall portions arranged with a gap therebetween in a peripheral direction of the output gear, and a third wall portion sandwiched between the first and second wall portions and positioned further on the outer side in the radial direction of the output gear than the first and second wall portions, and the first wall portion, the second wall portion and the third wall portion form the recess portion.

Further, preferably, the recess portion has an inclined face that is inclined to the outer side in the radial direction of the output gear toward a central axis of the differential gear support body on at least part of a bottom face of the recess portion.

Furthermore, preferably, each of the outer support parts has a fourth wall portion that connects the first and second wall portions and forms an inside face of at least one side, in the axial direction of the output gear, of the recess portion.

Moreover, preferably, a projecting portion is provided on either one face of abutment faces between each of the outer support parts and the first and second cover members, and a groove portion engaging with the projecting portion is provided in the other face of the abutment faces between each of the outer support parts and the first and second cover members.

Further, preferably, the support member has a cavity in a center part thereof, and an inner support part supporting the other end part of the differential gear support body on an inner side, in the radial direction of the output gear, of each of the opposite ends-supporting parts has a through hole having one end opening in the cavity and the other end opening on the differential gear side.

Furthermore, in order to attain the above object, the other differential device according to the present invention comprises a differential case and a differential gear mechanism housed within the differential case, the differential gear mechanism comprising a plurality of differential gears, at least one differential gear support body supported on the differential case and supporting the plurality of differential gears, and a pair of output gears meshing with each of the plurality of differential gears, a recess part being formed in an inner face of the differential case opposing a back face of each of the plurality of differential gears, the recess part being indented on an outer side in the radial direction of the output gear.

Further, preferably, the differential device further comprises a washer disposed between the recess part and a back face of the differential gear opposing the recess part, wherein an internal diameter of the recess part is the same as an external diameter of the washer or larger than the external diameter of the washer.

Effects of the Invention

In accordance with the present invention, the lubrication performance of rotational sliding surfaces between a back face of a differential gear and a differential case can be improved.

MODES FOR CARRYING OUT THE INVENTION

Figure 1:
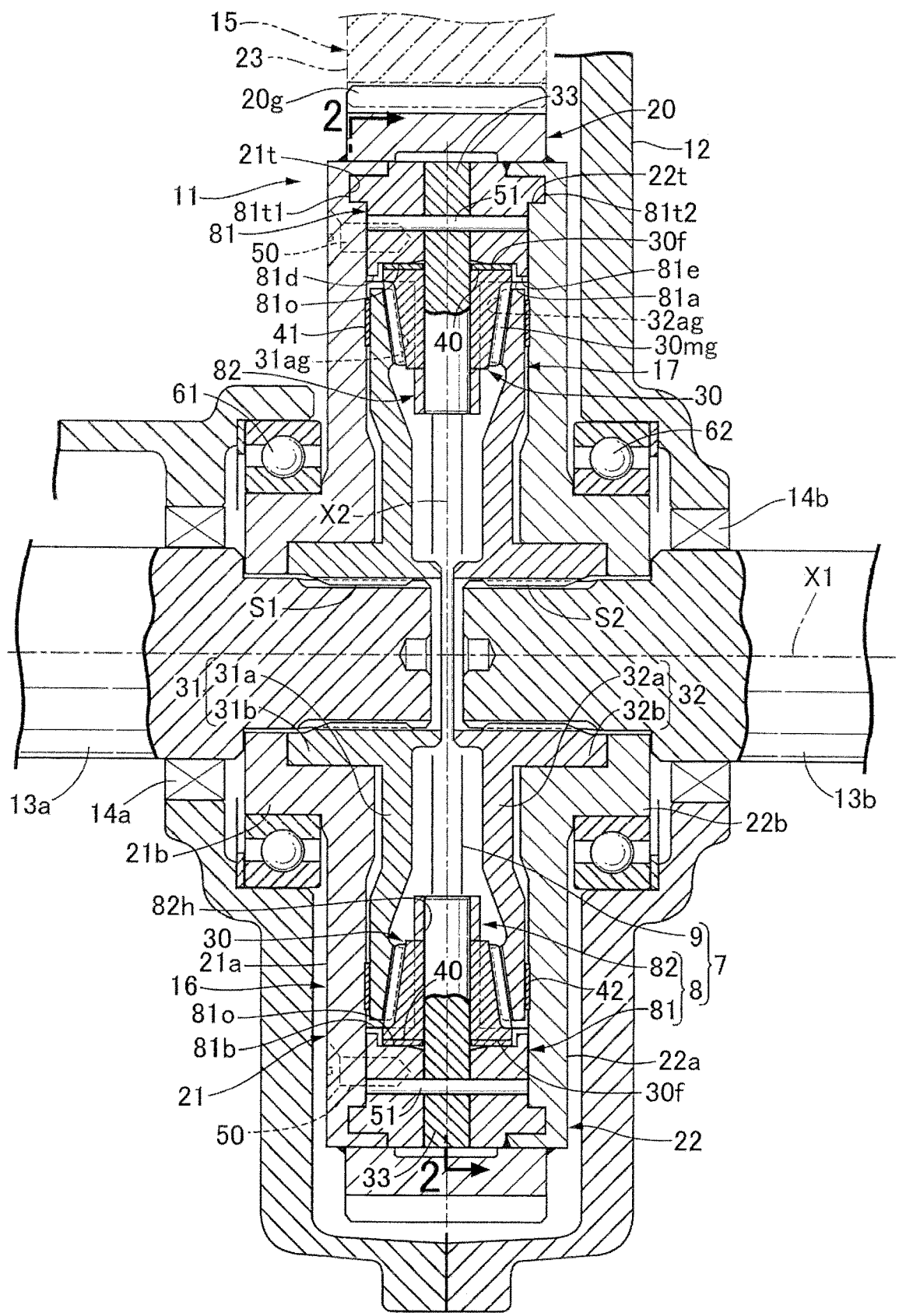
FIG. 1 is a sectional view (sectional view along line 1-1 in FIG. 2) schematically showing the overall arrangement of a differential device related to a first embodiment of the present invention. (first embodiment)
Figure 2:
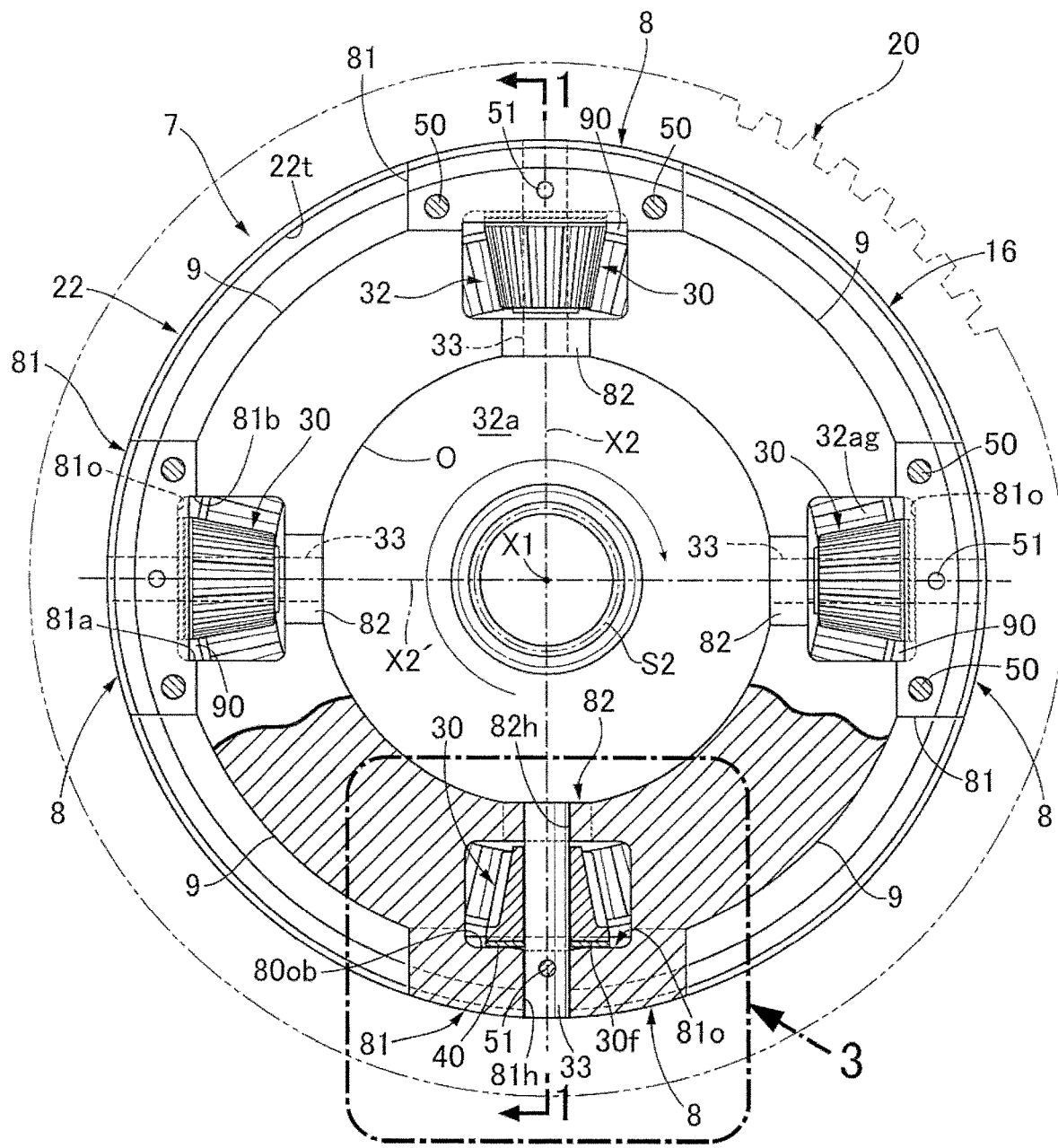
FIG. 2 is a sectional view along line 2-2 in FIG. 1. (first embodiment)
Figure 3:
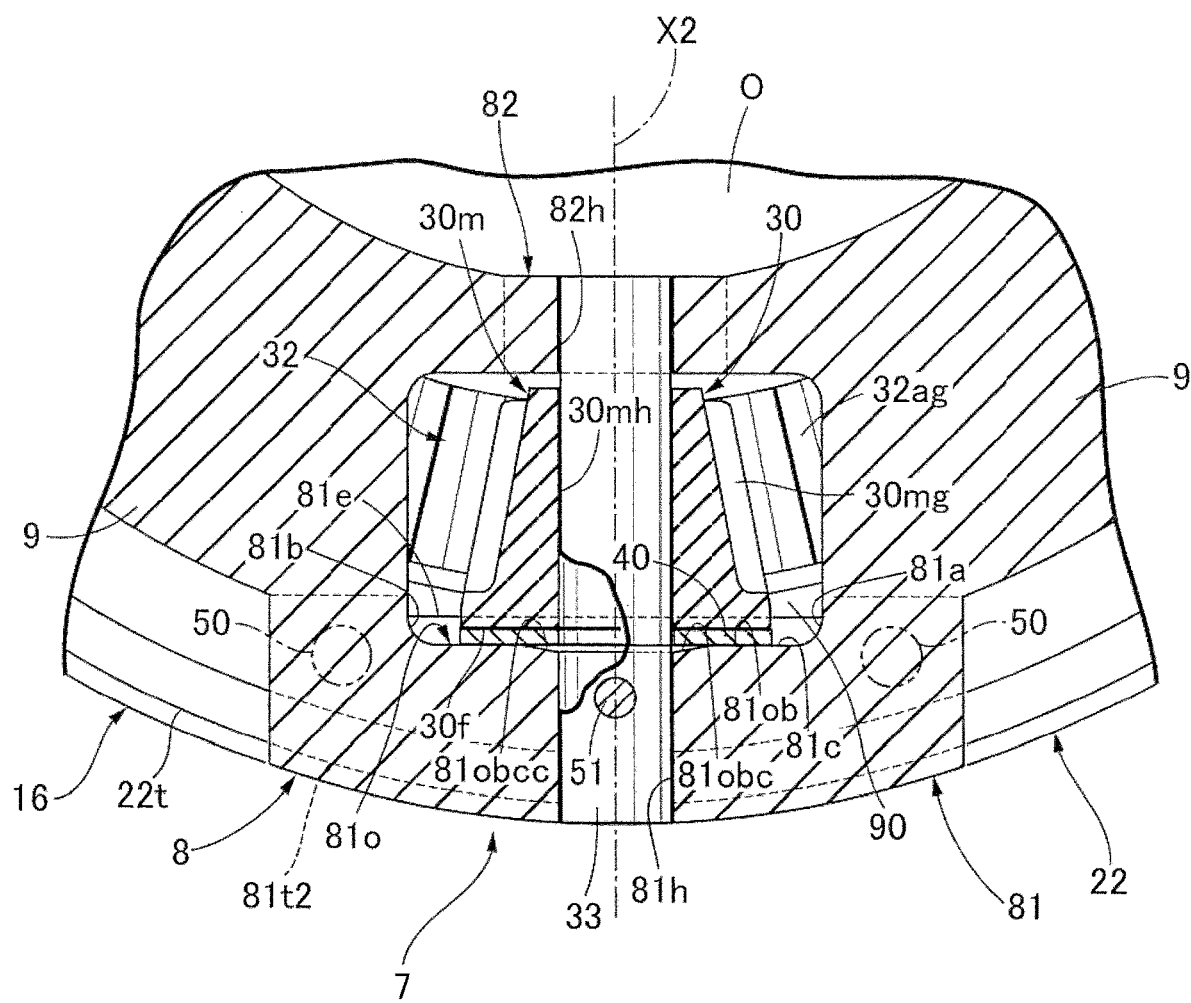
FIG. 3 is an enlarged view of part shown by arrow 3 in FIG. 2. (first embodiment)
Figure 4:
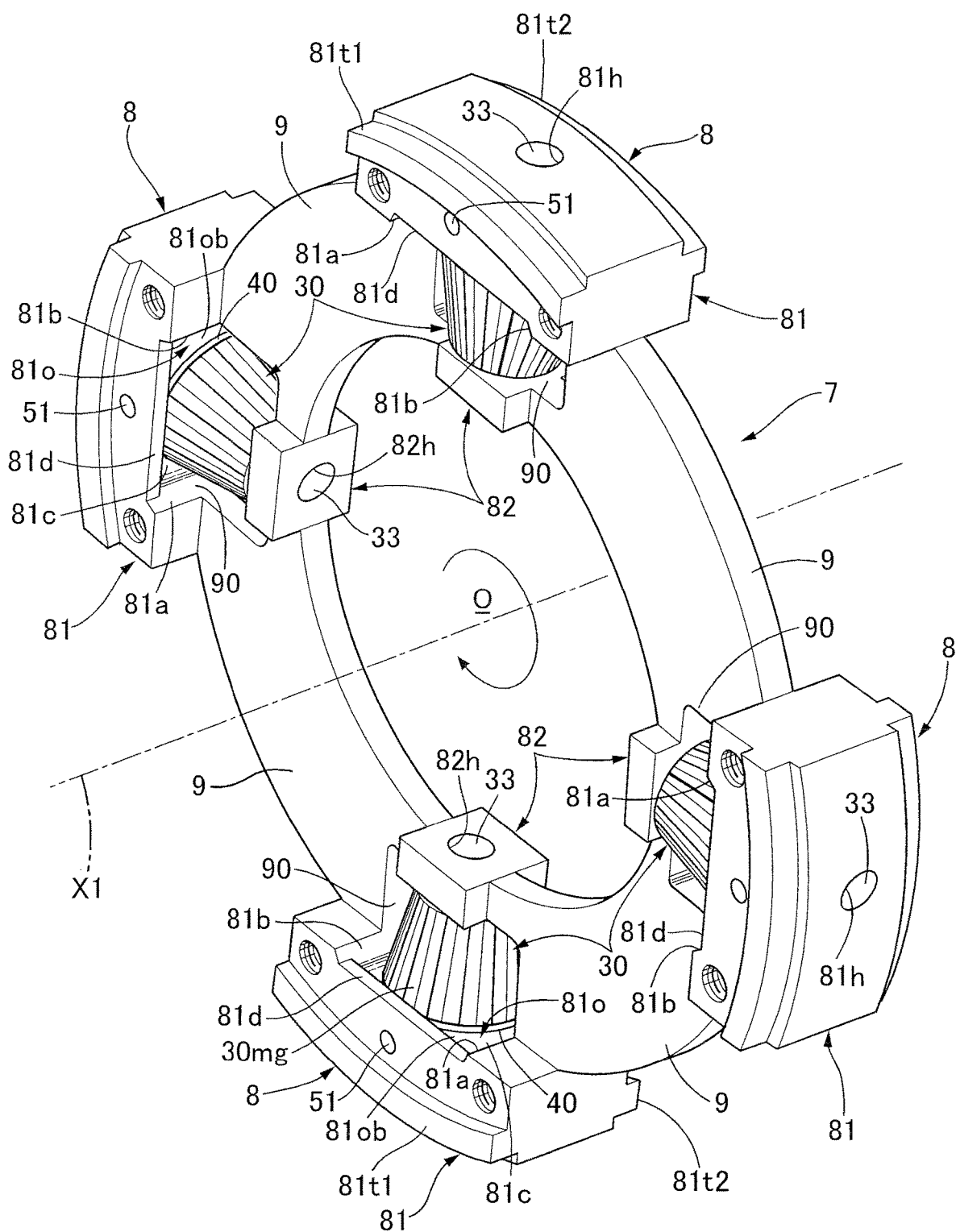
FIG. 4 is a perspective view showing a support member of the differential device related to the first embodiment of the present invention. (first embodiment)

Embodiments of the present invention are explained below by reference to the attached drawings.

First Embodiment

First, referring to FIG. 1 to FIG. 4, a differential device 11 related to a first embodiment of the present invention is explained. An automobile includes a transmission case 12 that is disposed next to an engine (not illustrated) as a power source mounted in the automobile and houses a transmission (not illustrated) or the differential device 11. Inner end parts of left and right, first and second output shafts 13$a$ and 13$b$ that are each connected to an axle and can rotate around a first axis X1 are inserted into the transmission case 12. The inner end parts of the first and second output shafts 13$a$ and 13$b$ are joined to a pair of output parts (first and second side gears 31 and 32, which are described later) of the differential device 11.

Annular seal members 14$a$ and 14$b$ are for example fitted between the transmission case 12 and the first and second output shafts 13$a$ and 13$b$. The seal members 14$a$ and 14$b$ liquid-tightly seal the first and second output shafts 13$a$ and 13$b$, which rotate relative to the transmission case 12. In this embodiment, an oil pan (not illustrated) is formed in a bottom part of the transmission case 12, the oil pan facing the internal space of the transmission case 12 and storing a predetermined amount of lubricating oil. Lubricating oil stored in the oil pan is scooped up and scattered around in the internal space of the transmission case 12 by rotation of a differential case 16, which is described later, rotation of a movable element of a reduction gear mechanism 15 that transmits power from a power source to the differential case 16, etc. Mechanical moving parts present inside and outside the differential case 16, which is described later, are lubricated with lubricating oil scattered within the transmission case 12.

The differential device 11 includes for example the differential case (input member) 16 supported on the transmission case 12 via first and second bearings 61 and 62 so that it can rotate around the first axis X1, a differential gear mechanism 17 housed within the differential case 16, and a ring member (driven member) 20 connected to an end part of the outer periphery of the differential case 16 so as to cover the outer periphery of the differential case 16.

The differential case 16 includes for example first and second cover members 21 and 22 sandwiching the differential gear mechanism 17 in a direction along the first axis X1, that is, in the axial direction of the differential case 16 (in the axial direction of side gears 31 and 32, which are described later), and an annular support member 7 disposed between the first and second cover members 21 and 22, disposed so as to be covered by the ring member 20, and capable of being connected to the first and second cover members 21 and 22.

Therefore, the first cover member 21, the second cover member 22, and the support member 7 each form part of the differential case 16.

The first cover member 21 has for example a flat first side wall portion 21a formed into a circular ring shape having the first axis X1 as a center, and a first boss portion 21b extending from an end part of the inner periphery of the first side wall portion 21a outward in the axial direction of the side gears 31 and 32, which are described later (that is, toward the side opposite to a face opposing the second cover member 22).

The second cover member 22 has for example a flat second side wall portion 22a formed into a circular ring shape having the first axis X1 as a center, and a second boss portion 22b extending from an end part of the inner periphery of the second side wall portion 22a outward in the axial direction of the side gears 31 and 32, which are described later (that is, toward the side opposite to a face opposing the first cover member 21).

The first cover member 21 and the second cover member 22 cover for example the differential gear mechanism 17 from one side and the other side respectively in the axial direction of the differential case 16. At least one of the first and second cover members 21 and 22 is provided for example with a through hole (not illustrated) via which lubricating oil can flow, the through hole providing communication between the interior of the differential case 16 and the interior of the transmission case 12. The first and second boss portions 21b and 22b are supported on the transmission case 12 via the first and second bearings 61 and 62.

The ring member 20 is for example disposed so as to cover the support member 7 from the radially outer side of the differential case 16 (the outer side in the radial direction of the side gears 31 and 32, which are described later), and is connected to each of the end parts of the outer periphery of the first and second cover members 21 and 22 by welding. The ring member 20 is provided with for example outward-facing gear teeth 20g on an outer peripheral face. The gear teeth 20g mesh with a drive gear 23 of the reduction gear mechanism 15. Power of the engine is thereby transmitted from the transmission to the differential case 16 via the ring member 20.

The ring member 20 and the first and second cover members 21 and 22 are joined by welding in the present embodiment, but the present invention is not limited thereto, and other joining means (for example screwing, press fitting, etc.) may be used. The ring member 20 is one example of the input member.

The differential gear mechanism 17 has for example a plurality of (for example four) pinion gears (differential gears) 30 supported so that they can rotate around second axes X2 and X2' orthogonal to the first axis X1, a pair of the side gears (output gears) 31 and 32 (that is, a first side gear (one output gear, other output gear) 31 and a second side gear (other output gear, one output gear) 32 each meshing with the plurality of pinion gears 30 and supported so that they can rotate around the first axis X1, and a plurality of pinion shafts (differential gear support bodies, differential gear support members) 33 supporting the respective pinion gears 30 so that they can rotate around the second axes X2 and X2'.

The first side gear 31 has for example a flat first side wall portion 31a formed into a circular ring shape having the first axis X1 as a center, and a first boss portion 31b extending from an end part of the inner periphery of the first side wall portion 31a outward in the axial direction of the first side gear 31 (that is, toward the side opposite to a face opposing the second side gear 32).

The first side wall portion 31a has for example gear teeth 31ag formed on an inner side, in the axial direction of the side gears 31 and 32, of an outer peripheral part (on the face side opposing the second side gear 32). The gear teeth 31ag are for example formed as a bevel gear. A back face 31f of the first side wall portion 31a that is on the outer side, in the axial direction of the side gears 31 and 32, of the first side wall portion 31a (on the side opposite to the face opposing the second side gear 32) is covered by the first cover member 21 (more specifically the first side wall portion 21a) and rotatably and slidably supported via a side gear washer (washer) 41.

An outer peripheral part of the first boss portion 31b is relatively rotatably fitted into and supported on an inner peripheral part of the first boss portion 21b of the first cover member 21. An inner peripheral part of the first boss portion 31b is relatively non-rotatably fitted onto the outer periphery of an inner end part of the first output shaft 13a (for example in the present embodiment by a spline fitting S1).

The second side gear 32 has for example a flat second side wall portion 32a formed into a circular ring shape having the first axis X1 as a center, and a second boss portion 32b extending from an end part of the inner periphery of the second side wall portion 32a outward in the axial direction of the second side gear 32 (that is, toward the side opposite to a face opposing the first side gear 31).

The second side wall portion 32a has for example gear teeth 32ag formed on an inner side, in the axial direction of the side gears 31 and 32, of an outer peripheral part (on the face side opposing the first side gear 31). The gear teeth 32ag are formed as for example a bevel gear. A back face 32f of the second side wall portion 32a that is on the outer side, in the axial direction of the side gears 31 and 32, of the second side wall portion 32a (on the side opposite to the face opposing the first side gear 31) is covered by the second cover member 22 (more specifically the second side wall portion 22a) and rotatably and slidably supported via a side gear washer (washer) 42.

An outer peripheral part of the second boss portion 32b is relatively rotatably fitted into and supported on an inner peripheral part of the second boss portion 22b of the second cover member 22. An inner peripheral part of the second boss portion 32b is relatively non-rotatably fitted onto the outer periphery of an inner end part of the second output shaft 13b (for example in the present embodiment by a spline fitting S2).

In addition, the side gear washers 41 and 42 may be omitted, and the back faces 31f and 32f of the first and second side gears 31 and 32 may be rotatably and slidably supported directly on inside faces of the corresponding first and second cover members 21 and 22 (more specifically the first and second side wall portions 21a and 22a).

Individual pinion gears 30 have for example a gear main body portion 30m having in a center part a shaft hole 30mh through which the pinion shaft 33 relatively rotatably extends, and a gear tooth portion 30mg formed on an outer peripheral face of the gear main body portion 30m and tapered toward the first axis X1. The gear teeth 30mg are for example formed as a bevel gear.

A back face 30f of the pinion gear 30 (more specifically, an end face, on the outer side in the radial direction of the side gears 31 and 32, of the gear main body portion 30m) is formed into a ring-shaped flat face orthogonal to the rotational axis of the pinion gear 30 (that is, second axes X2 and X2'). Instead of the ring-shape flat face, the back face 30f of the pinion gear 30 may be formed from part of a spherical surface having a center on the rotational axis of the pinion gear 30, or from a tapered face.

The support member 7 includes for example a plurality of support bodies (opposite ends-supporting parts) 8 supporting opposite end parts of each of the plurality of pinion shafts 33 and arranged at equal intervals in the peripheral direction of the side gears 31 and 32, and a plurality of substantially arc-shaped linking bodies 9 formed so as to be thinner than the support body 8 in the axial direction of the side gears 31 and 32 and joining two adjacent support bodies 8 to each other in the peripheral direction of the side gears 31 and 32.

The plurality of support bodies 8 and linking bodies 9 are arranged alternately in an annular shape having the first axis X1 as a center. The support member 7 is therefore formed into a ring shape overall. The support member 7 therefore has in its center part a cavity O bounded by the plurality of support bodies 8 and linking bodies 9.

In the present embodiment, four support bodies 8 are disposed at equal intervals in the peripheral direction of the side gears 31 and 32, but the present invention is not limited thereto. In the present invention, for example, two, three, five, or more may be disposed so as to match the number of pinion gears 30, which are described later.

Each support body 8 includes for example a first support part (outer support part) 81 having a first support hole 81*h* through which an end part (one end part, other end part), on the outer side in the radial direction of the side gears 31 and 32, of the pinion shaft 33 is inserted and supported, and a second support part (inner support part) 82 having a second support hole 82*h* through which an end part (other end part, one end part), on the inner side in the radial direction of the side gears 31 and 32, of the pinion shaft 33 is inserted and supported.

A space 90 in which the pinion gear 30 can be housed is formed between the first support part 81 and the second support part 82. The space 90 is open on opposite sides in the axial direction of the side gears 31 and 32. Because of this, the space 90 communicates directly with the interior of the differential case 16. The second support hole 82*h* is one example of a through hole, in which one end opens in the cavity O in the center of the support member 7, and the other end opens on the pinion gear 30 side (that is, in the space 90).

A through hole (not illustrated) in which one end opens in the cavity O and the other end opens on the pinion gear 30 side (that is, in the space 90) may be formed in the second support part 82 in addition to the second support hole 82*h*.

An end part, on the outer side in the radial direction of the side gears 31 and 32, of the support body 8, that is, the first support part 81, has for example first and second wall portions 81*a* and 81*b* arranged with a gap therebetween in the peripheral direction of the side gears 31 and 32 on the inner side in the radial direction of the side gears 31 and 32, a third wall portion 81*c* sandwiched between the first and second wall portions 81*a* and 81*b* and positioned further on the outer side in the radial direction of the side gears 31 and 32 than the first and second wall portions 81*a* and 81*b*, and fourth and fifth wall portions 81*d* and 81*e* arranged with a gap therebetween, in the axial direction of the side gears 31 and 32, and sandwiching the third wall portion 81*c* therebetween. A recess portion 81*o* is formed from the first, second, and third wall portions 81*a*, 81*b*, and 81*c*. The fourth and fifth wall portions 81*d* and 81*e* form an inside face, in the axial direction of the side gears 31 and 32, of the recess portion 81*o*. At least one of the fourth and fifth wall portions 81*d* and 81*e* can be omitted. That is, in the present invention, at least one inside face, in the axial direction of the side gears 31 and 32, of the recess portion 81*o* may not be formed. That is, a bottom face 81*ob* of the recess portion 81*o* is formed from the third wall portion 81*c*, and a side face in the peripheral direction of the side gears 31 and 32 is formed from the first and second wall portions 81*a* and 81*b*. The bottom face 81*ob* of the recess portion 81*o* rotatably and slidably supports the back face 30*f* of the pinion gear 30 via a pinion gear washer (washer) 40. The pinion gear washer 40 may be omitted, and the back face 30*f* of the pinion gear 30 may be rotatably and slidably supported directly on the bottom face 81*ob* of the recess portion 81*o*.

A conical face (inclined face) 81*obcc* that is inclined on the outer side in the radial direction of the side gears 31 and 32 toward the central axis (second axes X2 and X2') of the pinion shaft 33 (inclined downward to the central axis side of the pinion shaft 33) is for example formed on at least part of the bottom face 81*ob* of the recess portion 81*o* (in the present embodiment a center portion 81*obc* of the bottom face 81*ob*).

In the present embodiment, an arrangement in which the internal diameter at the open end of the conical face 81*obcc* is smaller than the external diameter of the back face 30*f* of the pinion gear 30 (more specifically, the pinion gear washer 40) is illustrated, but the present invention is not limited thereto. In the present invention, for example, the external diameter of the back face 30*f* of the pinion gear 30 may be the same as or substantially the same as the internal diameter at the open end of the conical face 81*obcc*. In this case, the gradient of the conical face 81*obcc* is for example desirably set to be a small gradient such that the conical face 81*obcc* is substantially in plane contact with the back face 30*f* of the pinion gear 30.

The first support part 81 is held between the first and second cover members 21 and 22 in the axial direction of the side gears 31 and 32. That is, opposite faces, in the axial direction of the side gears 31 and 32, of the first support part 81 abut against inside faces of end parts of the outer periphery of the first and second cover members 21 and 22 opposing the opposite faces, in the axial direction of the side gears 31 and 32, of the first support part 81.

Furthermore, for example, a first projecting portion (projecting portion, projection) 81*t*1 extending in an arc shape along the peripheral direction of the side gears 31 and 32 is formed integrally with either one of the abutment faces between the first support part 81 and the first cover member 21 (one side face of the first support part 81 in the present embodiment). A groove-shaped first groove portion (groove portion) 21*t* extending in an arc shape (in the present embodiment a ring shape) along the peripheral direction of the side gears 31 and 32 is for example provided in the other one of the abutment faces between the first support part 81 and the first cover member 21 (in the present embodiment the inside face of an end part of the outer periphery of the first cover member 21), the first groove portion 21*t* engaging with the first projecting portion 81*t*1 and concentrically positioning the first cover member 21 with respect to the support member 7.

Moreover, for example, a second projecting portion (projecting portion, projection) 81*t*2 extending in an arc shape along the peripheral direction of the side gears 31 and 32 is formed integrally with either one of the abutment faces between the first support part 81 and the second cover member 22 (in the present embodiment the other side face of the first support part 81). A groove-shaped second groove portion (groove portion) 22*t* extending in an arc shape (in the present embodiment a ring shape) along the peripheral direction of the side gears 31 and 32 is for example provided in the other one of the abutment faces between the first support part 81 and the second cover member 22 (in the present embodiment an inside face of an end part of the outer periphery of the second cover member 22), the second groove portion 22t engaging with the second projecting portion 81t2 and concentrically positioning the second cover member 22 with respect to the support member 7.

The support body 8 is for example joined to the first cover member 21 by means of a bolt 50 that extends through the first cover member 21 and is screwed into the first support part 81. The pinion shaft 33 is for example retained on the first support part 81 by means of a pin 51 that extends through so as to transect the first support part 81 and the pinion shaft 33. Since the pin 51 has opposite ends opposing the inside faces of the first and second cover members 21 and 22, in a state in which the first and second cover members 21 and 22 are joined to the support body 8 the first and second cover members 21 and 22 retain the pin 51 so that it does not fall out from the first support part 81.

The operation of this embodiment is now explained. In the differential device 11 of the embodiment, if the differential case 16 receives rotational power from the engine via the reduction gear mechanism 15 and the ring member 20, when the pinion gear 30 revolves around the central axis of the differential case 16, that is, the first axis X1, together with the differential case 16 without spinning around the pinion shaft 33, the first and second side gears 31 and 32 are rotated at the same speed by the differential case 16 via the pinion gear 30, and the driving force of the first and second the side gears 31 and 32 is equally transmitted to the left and right, first and second output shafts 13a and 13b. When there is a difference in rotational speed between the first and second output shafts 13a and 13b due to the automobile turning, etc., the pinion gear 30 revolves around the first axis X1 while spinning, thereby transmitting the rotational driving force from the pinion gear 30 to the first and second side gears 31 and 32 while allowing differential rotation. The above is the same as in the operation of a conventionally known differential device.

While the differential device 11 is operating in this way, lubricating oil scattered within the transmission case 12 circulates for example in the interior and the exterior of the differential case 16 via the spline fitting parts S1 and S2 between the first and second output shafts 13a and 13b and the first and second side gears 31 and 32 or via through holes (not illustrated) provided in the first and second cover members 21 and 22. Part of the lubricating oil entering between mutually opposing faces of the first and second side gears 31 and 32 (for example the cavity O of the support member 7) moves outward in the radial direction of the side gears 31 and 32 by virtue of centrifugal force, flows for example between the mating faces of the pinion shaft 33 and the support hole 82h of the second support part 82 of the support body 8 or between the mating faces of the pinion gear 30 and the pinion shaft 33, reaches the vicinity of the back face 30f of the pinion gear 30, and builds up in the recess portion 81o of the first support part 81. Another part of the lubricating oil that has flowed in between the mutually opposing faces of the first and second side gears 31 and 32 moves, by virtue of centrifugal force, toward for example a part where the first and second side gears 31 and 32 mesh with the pinion gear 30, furthermore, reaches the vicinity of the back face 30f of the pinion gear 30, and builds up in the recess portion 81o of the first support part 81.

When assembling the differential device 11 of the present embodiment, for example, a sub-assembly (that is, one in a state shown in FIG. 4) obtained by fitting the pinion gear 30 and the pinion gear washer 40 into the space 90 formed between the first and second support parts 81 and 82 of each support body 8 of the support member 7, inserting the pinion shaft 33 through the pinion gear 30, the pinion gear washer 40, and the first and second support parts 81 and 82, and retaining the pinion shaft 33 by means of the pin 51 is assembled in advance.

The sub-assembly, the first and second side gears 31 and 32, and the side gear washers 41 and 42 are placed in an appropriate arrangement. The sub-assembly, first and second side gears 31 and 32, and side gear washers 41 and 42 thus appropriately arranged are sandwiched between the first and second cover members 21 and 22. The first cover member 21 and the support member 7 (more specifically the first support part 81) are joined by means of the bolt 50.

The second cover member 22 and the support member 7 (more specifically the first support part 81) are welded. A joined body of the differential gear mechanism 17 and the first and second cover members 21 and 22 is thereby formed. The ring member 20 is fitted around the joined body of the differential gear mechanism 17 and the first and second cover members 21 and 22. Outer peripheral faces of the first and second cover members 21 and 22 and the ring member 20 are welded. The differential device 11 is thus produced.

In accordance with the present embodiment, the recess portion 81o of the first support part 81 opens on the inner side in the radial direction of the side gears 31 and 32, faces the back face 30f of the pinion gear 30 (in the present embodiment the pinion gear washer 40), and is covered by the first and second cover members 21 and 22 from opposite sides in the axial direction of the side gears 31 and 32. Because of this, while the differential device 11 is operating, lubricating oil easily builds up in the recess portion 81o of the first support part 81, and the back face 30f of the pinion gear 30 and the pinion gear washer 40 can be lubricated efficiently with the lubricating oil thus built up. That is, lubricating oil built up in the recess portion 81o can be supplied sufficiently to the rotational sliding surfaces between the back face 30f and the pinion gear washer 40, thereby enhancing the ease of lubrication of the differential device 11. This enables the lubrication performance of the rotational sliding surfaces between the back face 30f of the pinion gear 30 and the support member 7 to be improved.

Even if the pinion gear washer 40 is omitted and the back face 30f of the pinion gear 30 is put in direct contact with the bottom face 81ob of the recess portion 81o, lubricating oil built up in the recess portion 81o can be supplied sufficiently to the rotational sliding surfaces between the back face 30f and the bottom face 81ob, thereby enhancing the ease of lubrication of the differential device 11. This enables the lubrication performance of the rotational sliding surfaces between the back face 30f of the pinion gear 30 and the support member 7 to be improved.

Furthermore, in accordance with the present embodiment, at least part of the bottom face 81ob of the recess portion 81o (in the present embodiment the center portion 81obc) is formed from the conical face (inclined face) 81obcc (downwardly inclined on the central axis side of the pinion shaft 33) inclined outward, in the radial direction of the side gears 31 and 32, toward the central axis (the second axes X2 and X2') of the pinion shaft 33. This enables a sufficient amount of lubricating oil stored in the recess portion 81o to be ensured without greatly impairing the strength with which the pinion gear washer 40 is supported by the bottom face 81ob of the recess portion 81o.

In accordance with the present embodiment, due to engagement between the first projecting portion 81t1 and the first groove portion 21t, which are provided on one and the other of the abutment faces between the first support part 81 and the first cover member 21, the first cover member 21 can easily be positioned concentrically with respect to the support member 7. This enables the strength with which the support member 7 and the first cover member 21 are joined to be enhanced.

Due to engagement between the second projecting portion 81t2 and the second groove portion 22t, which are provided on one and the other of the abutment faces between the second support part 82 and the second cover member 22, the second cover member 22 can easily be positioned concentrically with respect to the support member 7. This enables the strength with which the support member 7 and the second cover member 22 are joined to be enhanced.

Therefore, in accordance with the present embodiment, an operation of positioning when holding the sub-assembly between the first and second cover members 21 and 22 can be easily and appropriately carried out. Because of this, the ease of assembly of the differential device 11 can be enhanced.

Second Embodiment

A differential device 111 related to a second embodiment of the present invention is now explained by reference to FIG. 5. In the first embodiment, the first and second cover members 21 and 22, which are opposite side walls of the differential case 16, are flattened to thus flatten the differential case 16 in the axial direction, but in the second embodiment the differential device 111, in which a differential case is formed into a substantially spherical shape, is explained.

The differential device 111 includes for example a differential case 116 formed into a substantially spherical shape, a differential gear mechanism 117 housed within the differential case 116, and a ring gear (driven gear, ring member, driven member) 120 connected to the differential case 116.

The differential case 116 may be formed as an integrated type as shown in the second embodiment or may be formed by dividing it into a plurality of case elements and fastening the case elements to each other. When the differential case 116 is at least of the integrated type, a through hole (not illustrated) for assembly is formed in a peripheral wall of the differential case 116, elements of the differential gear mechanism 117 (for example, first and second side gears 131 and 132, a pinion gear 130, etc., which are described later) being inserted into and taken out via the through hole.

The ring gear 120 is connected to for example an outer peripheral part of the differential case 116 by means of a screw. The ring gear 120 meshes with a drive gear 123 of a reduction gear mechanism 115 connected to an engine. Rotational power is therefore inputted into the differential case 116 from the engine via the reduction gear mechanism 115 and the ring gear 120. The ring gear 120 may be formed integrally with the differential case 116. The ring gear 120 is one example of an input member.

The differential case 116 has for example formed in the interior thereof a space that can house the differential gear mechanism 117, and has a main body portion 116a having an inner face 116i formed as a spherical shape, a first boss 116b projectingly provided integrally with an end part on the right side of the main body portion 116a and formed on a first axis X1, and a second boss 116b' projectingly provided integrally with an end part on the left side of the main body portion 116a and formed on the first axis X1. The outer peripheries of the first and second bosses 116b and 116b' are supported on a transmission case 112 via bearings 161 and 162 so that they can rotate around the first axis X1. Left and right first and second output shafts 113a and 113b that are each connected to an axle are fitted into and supported on the inner periphery of the first and second bosses 116b and 116b' so that they can rotate around the first axis X1.

Helical grooves 116s and 116s' are formed in at least one of mating faces between outer peripheral faces of the first and second output shafts 113a and 113b and inner peripheral faces of the first and second bosses 116b and 116b' (in the present embodiment the inner peripheral faces of the first and second bosses 116b and 116b'). The grooves 116s and 116s' exhibit a screw pump action accompanying relative rotation between the first and second output shafts 113a and 113b and the first and second bosses 116b and 116b' when an automobile is traveling forward. This enables lubricating oil within the transmission case 112 to be drawn into the differential case 116. The differential case 116 is one example of the input member.

The differential gear mechanism 117 includes for example the first and second side gears (output gear, one output gear, other output gear) 131 and 132, which are arranged as a pair on the first axis X1 within the differential case 116, a single pinion shaft (differential gear support body, differential gear support member) 133 disposed on a second axis X2 orthogonal to the first axis X1 between mutually opposing faces of the first and second side gears 131 and 132, and a plurality (for example two) of the pinion gears (differential gears) 130 rotatably fitted onto and supported on the pinion shaft 133 and meshing with the first and second side gears 131 and 132. Gear teeth 130g, 131g, and 132g of the pinion gear 130 and the first and second side gears 131 and 132 are for example formed as a bevel gear.

Figure 5:
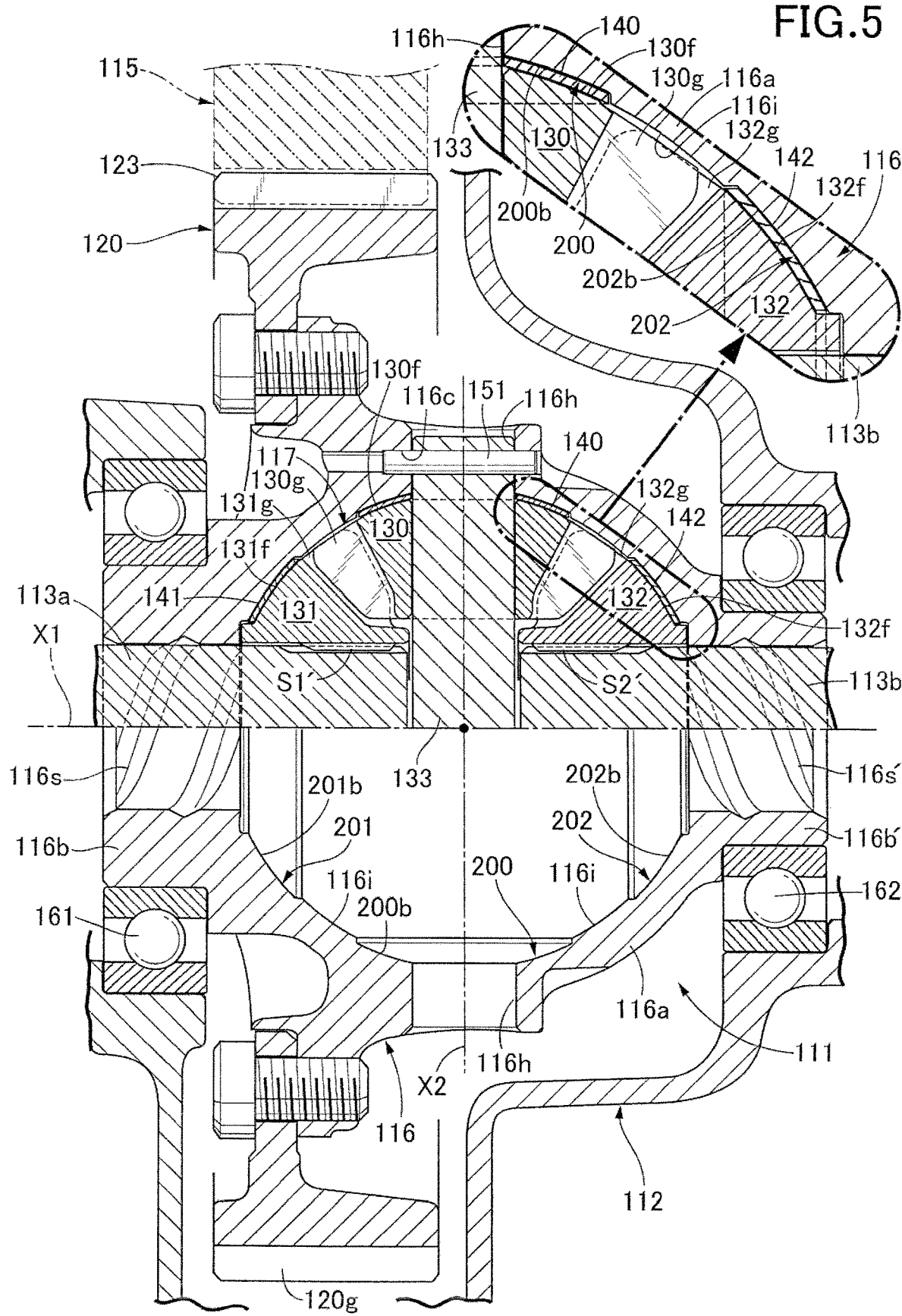
FIG. 5 is a sectional view schematically showing the overall arrangement of a differential device related to a second embodiment of the present invention. (second embodiment) EXPLANATION OF REFERENCE NUMERALS AND SYMBOLS
O Cavity
X2 Second axis (central axis)
7 Support member (differential case)
8 Support body (opposite ends-supporting part)
11, 111 Differential device
16 Differential case (input member)
17 Differential gear mechanism
21, 22 First, second cover member (differential case)
21$t$, 22$t$ First, second groove portion (groove portion)
30$f$, 31$f$, 32$f$, 130$f$ Back face
30, 130 Pinion gear (differential gear)
31, 131 First side gear (one output gear, other output gear, output gear)
32, 132 Second side gear (other output gear, one output gear, output gear)
33, 133 Pinion shaft (differential gear support body, differential gear support member)
81 First support part (outer support part)
81$o$ Recess portion
81$ob$ Bottom face
81$obcc$ Conical face (inclined face)
81$a$, 81$b$, 81$c$, 81$d$ First, second, third, fourth wall portion
81$t$1, 81$t$2 First, second projecting portion (projecting portion, projection)
82 Second support part (inner support part)
82$h$ Support hole (through hole)
116 Differential case (input member)
117 Differential gear mechanism
116$i$ Inner face
140 Pinion gear washer (washer)
200 Recess part

In FIG. 5, only upper halves, with respect to the first axis X1, of the differential gear mechanism 117 and the first and second output shafts 113a and 113b are illustrated, illustration of lower halves thereof being omitted, and the shape of the inner face 116i of the differential case 116 and the shape of the inner peripheral face of the first and second bosses 116b and 116b' are illustrated in an easily understandable way. The structures of the lower halves of the differential gear mechanism 117 and the first and second output shafts 113a and 113b, which are not illustrated, are symmetrical with those of the upper halves with respect to the first axis X1.

Outer peripheral faces of the first and second output shafts 113a and 113b are relatively non-rotatably fitted into inner peripheral faces of the first and second side gears 131 and 132 (in the present embodiment by spline fittings S1' and S2'). The first and second side gears 131 and 132 are thereby supported on the differential case 116 via the first and second output shafts 113a and 113b so that they can rotate around the first axis X1.

A back face 131f of the first side gear 131 and a back face 132f of the second side gear 132 are formed into an annular spherical surface around the first axis X1 so as to follow the inner face 116i of the differential case 116, which is formed into a spherical shape. Recess parts 201 and 202 facing the back faces 131f and 132f of the first and second side gears 131 and 132 are formed in the inner face 116i of the differential case 116 on the back face 131f side of the first side gear 131 and the inner face 116i of the differential case 116 on the back face 132f side of the second side gear 132 as shapes that are indented outward in the axial direction of the side gears 131 and 132. Bottom faces 201b and 202b of the recess parts 201 and 202 each rotatably and slidably support the corresponding back faces 131f and 132f via side gear washers (washers) 141 and 142.

The washers 141 and 142 may be omitted and the back faces 131f and 132f of the first and second side gears 131 and 132 may be rotatably and slidably supported directly on the corresponding bottom faces 201b and 202b of the recess parts 201 and 202; in this case it is necessary to make the back faces 131f and 132f be in direct contact with the bottom faces 201b and 202b.

In the present embodiment, the internal diameter of each of the recess parts 201 and 202 is set to be substantially the same as the external diameter of each of the back faces 131f and 132f (therefore the side gear washers 141 and 142), but the present invention is not limited thereto. In the present invention, for example, the internal diameter of each of the recess parts 201 and 202 may be set to be larger than the external diameter of each of the back faces 131f and 132f (and consequently the side gear washers 141 and 142).

In the present embodiment, the curvature of each of the bottom faces 201b and 202b of the recess parts 201 and 202 is set to be the same as the curvature of each of the back faces 131f and 132f (and consequently the side gear washers 141 and 142), but the present invention is not limited thereto. In the present invention, for example, a conical face (inclined face) that is inclined outward in the axial direction of the side gears 131 and 132 toward the rotational axis (that is, the first axis X1) of the first and second side gears 131 and 132 (downward inclination on the first axis X1 side) may be formed on at least part of each of the bottom faces 201b and 202b of the recess parts 201 and 202. In this case, the gradient of the conical face (inclined face) is for example desirably set to be a small gradient such that the conical face is substantially in plane contact with the back faces 131f and 132f (therefore the side gear washers 141 and 142).

Opposite end parts of the pinion shaft 133 (end parts, on the outer side in the radial direction of the side gears 131 and 132, of the pinion shaft 133) are respectively inserted through a pair of support holes 116h, provided on the second axis X2, of the differential case 116 and supported. One end part of the pinion shaft 133 is retained by a pin 151 extending through the pinion shaft 133 and the differential case 116. One end part of the pin 151 is joined to a pin mounting hole 116c of the differential case 116 (for example by press fitting, swaging, etc.).

A back face 130f of the pinion gear 130 is formed into an annular spherical surface around the second axis X2 so as to follow the inner face 116i of the differential case 116, which is formed into a spherical shape. A recess part 200 facing the back face 130f of the pinion gear 130 is formed in the inner face 116i of the differential case 116 on the back face 130f side of the pinion gear 130 as a shape that is indented outward in the radial direction of the side gears 131 and 132. A bottom face 200b of the recess part 200 rotatably and slidably supports the back face 130f of the pinion gear 130 via a pinion gear washer (washer) 140.

The pinion gear washer 140 may be omitted and the back face 130f of the pinion gear 130 may be rotatably and slidably supported directly on the bottom face 200b of the recess part 200, but in this case it is necessary to form the back face 130f so that it is in direct contact with the bottom face 200b of the recess part 200.

In the present embodiment, the internal diameter of the recess part 200 is set to be substantially the same as the external diameter of the back face 130f (and consequently the pinion gear washer 140), but the present invention is not limited thereto. In the present invention, for example, the internal diameter of the recess part 200 may be set to be larger than the external diameter of the back face 130f (and consequently the pinion gear washer 140).

In the present embodiment the curvature of the bottom face 200b of the recess part 200 is set to be the same as the curvature of the back face 130f (and consequently the pinion gear washer 140), but the present invention is not limited thereto. In the present invention, for example, a conical face (inclined face) inclined outward in the radial direction of the side gears 131 and 132 toward the rotational axis (that is, the second axis X2) of the pinion gear 130 (downwardly inclined toward the rotational axis side of the pinion gear 130) may be formed on at least part of the bottom face 200b of the recess part 200. In this case, the gradient of the conical face (inclined face) is for example desirably set to be a small gradient such that the conical face is substantially in plane contact with the back face 130f (and consequently the pinion gear washer 140).

In the second embodiment, the recess parts 200, 201, and 202 are formed in the inner face 116i of the differential case 116 corresponding to the back faces 130f, 131f, and 132f of the pinion gear 130 and the first and second side gears 131 and 132, the recess parts 200, 201, and 202 being indented further than the inner face 116i. The back faces 130f, 131f, and 132f are rotatably and slidably supported on the bottom faces 200b, 201b, and 202b of the recess parts 200, 201, and 202 via the corresponding pinion gear washer 140 or side gear washers 141 and 142.

While the differential device 111 is operating, lubricating oil that has reached the vicinity of the back faces 130f, 131f, and 132f of the pinion gear 130 and the first and second side gears 131 and 132 along the inner face 116i of the differential case 116 easily builds up in the recess parts 200, 201, and 202, which are indented with respect to the inner face 116i of the differential case 116.

Because of this, lubricating oil built up in the recess parts 200, 201, and 202 can be supplied sufficiently to rotational sliding surfaces between the back faces 130f, 131f, and 132f and the corresponding pinion gear washer 140 and side gear washers 141 and 142. The back faces 130f, 131f, and 132f and the corresponding pinion gear washer 140 and side gear washers 141 and 142 can thus be lubricated efficiently.

Therefore, in accordance with the second embodiment, the lubrication performance of rotational sliding surfaces between the back face 130f of the pinion gear 130 and the differential case 116 can be improved. The lubrication performance of rotational sliding surfaces between the differential case 116 and the back faces 131f and 132f of the first and second side gears 131 and 132 can also be improved.

Even in a case in which the pinion gear washer 140 and the side gear washers 141 and 142 are omitted, and the back faces 130f, 131f, and 132f of the pinion gear 130 and the first and second side gears 131 and 132 are made to be in direct contact with the bottom faces 200b, 201b, and 202b of the corresponding recess parts 200, 201, and 202, lubricating oil built up in the recess parts 200, 201, and 202 can be supplied sufficiently to rotational sliding surfaces between the back faces 130f, 131f, and 132f and the corresponding bottom faces 200b, 201b, and 202b. The lubrication performance of the rotational sliding surfaces between the back face 130f of the pinion gear 130 and the differential case can thus be improved. The lubrication performance of rotational sliding surfaces between the back faces 131f and 132f of the first and second side gears 131 and 132 and the differential case can also be improved.

Embodiments of the present invention are explained above, but the present invention is not limited to the above embodiments and may be modified in a variety of ways as long as the modifications do not depart from the subject matter thereof.

For example, in the first and second embodiments, the differential device is housed within an automobile transmission case, but the present invention is not limited thereto. The differential device of the present invention is not limited to a differential device for an automobile and may be applied to a differential device of various types of machines and devices.

Furthermore, in the first and second embodiments, an arrangement is shown in which the differential device is applied to a transmission system of left and right wheels of a vehicle and power is distributed between left and right drive shafts while allowing differential rotation, but the present invention is not limited thereto. In the present invention, for example, the differential device may be applied to a transmission system involving front and rear wheels of a front and rear wheel drive vehicle in which power is distributed between the front and rear driven wheels while allowing differential rotation.

In the first embodiment, as joining means between the support member 7 and each of the first and second cover members 21 and 22, a combination of bolting and welding is illustrated, but the present invention is not limited thereto. In the present invention for example, the support member 7 and both of the first and second cover members 21 and 22 may be joined by means of a bolt or may be joined by welding. In addition, the support member 7 and each of the first and second cover members 21 and 22 may be joined by joining means other than a bolt or welding.

In the second embodiment, a single pinion shaft is used, but the present invention is not limited thereto. In the present invention, a plurality of pinion shafts may be provided so as to match the number of pinion gears.

The first and second embodiments illustrate an arrangement in which the ring member (driven member) 20 or the ring gear (driven gear) 120, which have gear teeth on the outer peripheral face, is provided on an outer peripheral part of the differential case 16 or 116 as an input part that receives power from a power source, but the present invention is not limited thereto. In the present invention, for example, as the input part a driven wheel other than the ring gear (for example, a driven sprocket, a driven pulley, etc.) may be joined to the differential case (input member). Furthermore, in the present invention, for example, an output member of various types of power transmission mechanism or reduction gear mechanism (for example a planetary gear type reduction mechanism) connected to a power source may be joined to an outside face of the cover member of either one of the first and second cover members 21 and 22 of the first embodiment.

The invention claimed is:

1. A differential device comprising a differential case and a differential gear mechanism housed within the differential case,
the differential gear mechanism comprising
a plurality of differential gears,
a pair of output gears meshing with each of the plurality of differential gears, and
a plurality of differential gear support bodies supporting the plurality of differential gears respectively,
the differential case comprising
a support member having a plurality of opposite ends-supporting parts supporting opposite end parts of each of the plurality of differential gear support bodies,
a first cover member covering a back face of one of the output gears and capable of being joined to the support member, and
a second cover member covering a back face of the other output gear and capable of being joined to the support member,
a recess portion facing a back face of each of the differential gears being formed in an outer support part, supporting one end part of the differential gear support body on an outer side in a radial direction of the output gear, of each of opposite ends-supporting parts, and
a side, in an axial direction of the output gears, of each of the outer support parts being covered by the first and second cover members.

2. The differential device according to claim 1, wherein each of the outer support parts has first and second wall portions arranged with a gap therebetween in a peripheral direction of the output gear, and a third wall portion sandwiched between the first and second wall portions and positioned further on the outer side in the radial direction of the output gear than the first and second wall portions, and
the first wall portion, the second wall portion and the third wall portion form the recess portion.

3. The differential device according to claim 2, wherein the recess portion has an inclined face that is inclined to the outer side in the radial direction of the output gear toward a central axis of the differential gear support body on at least part of a bottom face of the recess portion.

4. The differential device according to claim 2, wherein each of the outer support parts has a fourth wall portion that connects the first and second wall portions and forms an inside face of at least one side, in the axial direction of the output gear, of the recess portion.

5. The differential device according to claim 1, wherein a projecting portion is provided on either one face of abutment faces between each of the outer support parts and the first and second cover members, and a groove portion engaging with the projecting portion is provided in the other face of the abutment faces between each of the outer support parts and the first and second cover members.

6. The differential device according to claim 1, wherein the support member has a cavity in a center part thereof, and
an inner support part supporting the other end part of the differential gear support body on an inner side, in the radial direction of the output gear, of each of the opposite ends-supporting parts has a through hole having one end opening in the cavity and the other end opening on the differential gear side.

7. The differential device according to claim 3, wherein each of the outer support parts has a fourth wall portion that connects the first and second wall portions and forms an inside face of at least one side, in the axial direction of the output gear, of the recess portion.

8. The differential device according to claim 2, wherein a projecting portion is provided on either one face of abutment faces between each of the outer support parts and the first and second cover members, and a groove portion engaging with the projecting portion is provided in the other face of the abutment faces between each of the outer support parts and the first and second cover members.

9. The differential device according to claim 3, wherein a projecting portion is provided on either one face of abutment faces between each of the outer support parts and the first and second cover members, and a groove portion engaging with the projecting portion is provided in the other face of the abutment faces between each of the outer support parts and the first and second cover members.

10. The differential device according to claim 4, wherein a projecting portion is provided on either one face of abutment faces between each of the outer support parts and the first and second cover members, and a groove portion engaging with the projecting portion is provided in the other face of the abutment faces between each of the outer support parts and the first and second cover members.

11. The differential device according to claim 7, wherein a projecting portion is provided on either one face of abutment faces between each of the outer support parts and the first and second cover members, and a groove portion engaging with the projecting portion is provided in the other face of the abutment faces between each of the outer support parts and the first and second cover members.

12. The differential device according to claim 2, wherein the support member has a cavity in a center part thereof, and
   an inner support part supporting the other end part of the differential gear support body on an inner side, in the radial direction of the output gear, of each of the opposite ends-supporting parts has a through hole having one end opening in the cavity and the other end opening on the differential gear side.

13. The differential device according to claim 3, wherein the support member has a cavity in a center part thereof, and
   an inner support part supporting the other end part of the differential gear support body on an inner side, in the radial direction of the output gear, of each of the opposite ends-supporting parts has a through hole having one end opening in the cavity and the other end opening on the differential gear side.

14. The differential device according to claim 4, wherein the support member has a cavity in a center part thereof, and
   an inner support part supporting the other end part of the differential gear support body on an inner side, in the radial direction of the output gear, of each of the opposite ends-supporting parts has a through hole having one end opening in the cavity and the other end opening on the differential gear side.

15. The differential device according to claim 7, wherein the support member has a cavity in a center part thereof, and
   an inner support part supporting the other end part of the differential gear support body on an inner side, in the radial direction of the output gear, of each of the opposite ends-supporting parts has a through hole having one end opening in the cavity and the other end opening on the differential gear side.

16. The differential device according to claim 5, wherein the support member has a cavity in a center part thereof, and
   an inner support part supporting the other end part of the differential gear support body on an inner side, in the radial direction of the output gear, of each of the opposite ends-supporting parts has a through hole having one end opening in the cavity and the other end opening on the differential gear side.

17. The differential device according to claim 8, wherein the support member has a cavity in a center part thereof, and
   an inner support part supporting the other end part of the differential gear support body on an inner side, in the radial direction of the output gear, of each of the opposite ends-supporting parts has a through hole having one end opening in the cavity and the other end opening on the differential gear side.

18. The differential device according to claim 9, wherein the support member has a cavity in a center part thereof, and
   an inner support part supporting the other end part of the differential gear support body on an inner side, in the radial direction of the output gear, of each of the opposite ends-supporting parts has a through hole having one end opening in the cavity and the other end opening on the differential gear side.

19. The differential device according to claim 10, wherein the support member has a cavity in a center part thereof, and
   an inner support part supporting the other end part of the differential gear support body on an inner side, in the radial direction of the output gear, of each of the opposite ends-supporting parts has a through hole having one end opening in the cavity and the other end opening on the differential gear side.

20. The differential device according to claim 11, wherein the support member has a cavity in a center part thereof, and
   an inner support part supporting the other end part of the differential gear support body on an inner side, in the radial direction of the output gear, of each of the opposite ends-supporting parts has a through hole having one end opening in the cavity and the other end opening on the differential gear side.

\* \* \* \* \*